D. WILDE.
Improvement in Corn-Stalk Cutters.
No. 129,384.  Patented July 16, 1872.
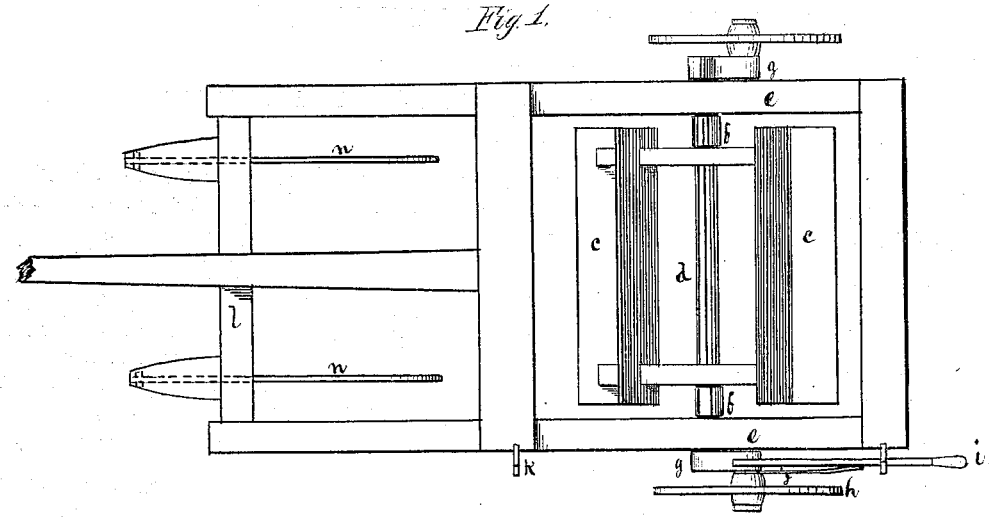
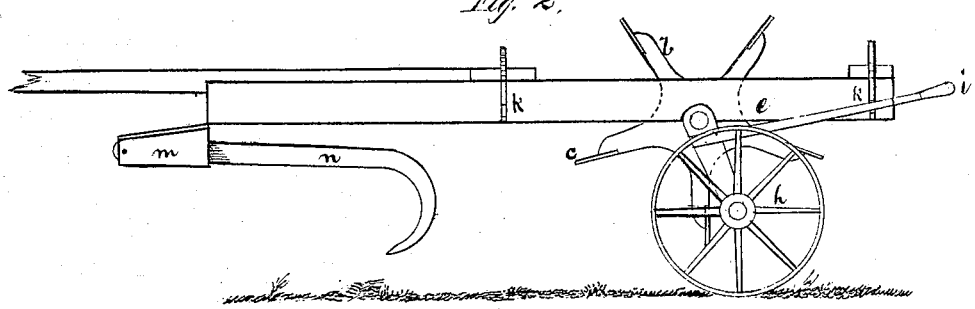
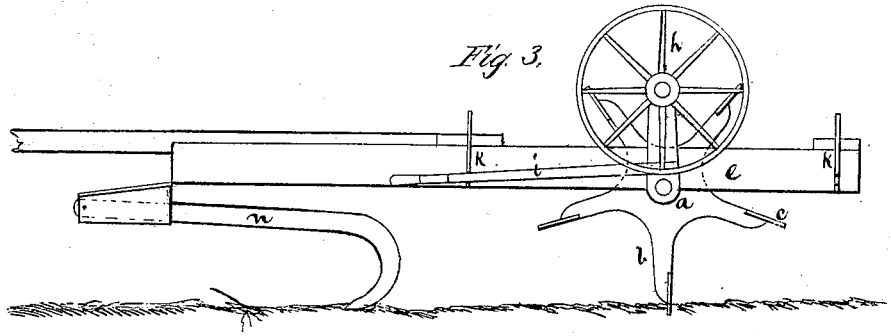

129,384

UNITED STATES PATENT OFFICE.

DANIEL WILDE, OF WASHINGTON, IOWA.

IMPROVEMENT IN CORNSTALK-CUTTERS.

Specification forming part of Letters Patent No. 129,384, dated July 16, 1872.

Specification describing certain Improvements in Cornstalk - Cutters, invented by DANIEL WILDE, of Washington, in the State of Iowa.

This invention relates to that class of machines whereby the cornstalks remaining in the ground after the gathering of the crop are cut up and mixed in with the soil by rotating cutters that are usually attached to a revolving cylinder.

In this improvement, instead of a cylinder, the heads $a$ having arms $b$, to which are affixed the cutters $c$, constitute the revolving means. These heads are not so attached to the shaft $d$ as to revolve with it, but surround the shaft and are moved around it. Between the heads and the bars $e$ of the frame are collars $f$ to prevent the cutters from coming in contact with the bars when rotating. The shaft $d$ is attached to the frame-bars $e$ on the under side by suitable bearings, and passes beyond the bars. To each end of the shaft there are cranks, $g$, to the ends of which the wheels $h$ are attached. The shaft $d$ and the cranks $g$ may all be made of one piece, and either of cast or wrought iron. To one of the cranks is attached a lever, $i$, by which the wheels may be elevated or lowered. The lever has a spring, $j$, to force the lever toward the catches $k$ for holding the lever in the one or the other position. The one position—that in which the wheels are down and the machine in a condition for travel—is shown by Fig. 2 of the drawing, and the other position—that in which the cutters are in the soil and the machine ready for use—being shown by Fig. 3. Figure 1 is a top view of the machine. To the front cross-bar $l$ are affixed boxes $m$, in which are pivoted the front ends of the gathering-hooks $n$. These boxes are made of one piece of metal, and the roofs taper and incline, as is fully shown by the drawing. By this form of the roof the interior of the box is protected and is not liable to become clogged or rusty, and the hooks have sufficient play.

Although I prefer to have the cutters attached, as described, to the arms of the heads, it will readily be seen that they may be attached to a cylinder, the cylinder not being keyed to the shaft but allowed to move around or upon it.

By placing the lever in the proper position the wheels are so arranged as to carry the whole weight of the machine, elevating the knives and gathering-hooks clear of the ground, in which position the machine is ready for travel on the road, or for turning at the ends of the rows of the stalks. By reversing the lever, the cranks and wheels are raised above the shaft, in which position all the weight of the heads, arms, wheels, and frame come upon the knife that is in the ground, thereby insuring better work, as great weight is necessary to make a successful cutter.

I claim—

1. The cutting-cylinder or heads revolving upon or around the shaft.

2. The shaft, extended beyond the frame for the cranks and wheels outside of the frame.

3. The boxes $m$, constructed as and for the purposes described.

This specification signed this 2d day of May, 1872.

DANIEL WILDE.

Witnesses:
   SAMUEL CONNER,
   JOHN WAGNER.